Oct. 30, 1962 SAKAE FUJIMOTO 3,060,940

DEVICE FOR PREPARING MAGNETIC RECORD MATRIX
PLATES IN MAGNETIC RECORDING MACHINES
OF SPIRAL TRACK TYPE

Filed Oct. 18, 1960

United States Patent Office 3,060,940

Patented Oct. 30, 1962

3,060,940

DEVICE FOR PREPARING MAGNETIC RECORD MATRIX PLATES IN MAGNETIC RECORDING MACHINES OF SPIRAL TRACK TYPE

Sakae Fujimoto, Chofu, Japan, assignor to Riken Kogaku Kogyo Kabushiki Kaisha and Nihon Denki Bunka Kogyo Kabushiki Kaisha, Tokyo, Japan, both corporations of Japan Filed Oct. 18, 1960, Ser. No. 63,355
Claims priority, application Japan Oct. 19, 1959
1 Claim. (Cl. 129—100.2)

This invention relates generally to a magnetic recording machine of the spiral track type and more particularly to a device for preparing magnetic record matrix plates in such a machine.

It has been common practice to superpose a magnetic record sheet, the magnetic layer of which is not magnetized, on a magnetic record sheet carrying information magnetically recorded in the magnetic layer thereof with both the magnetic layer facing each other and to move a magnetic transducer head being applied with an electric current along a magnetized track on the latter sheet whereby the track is transferred on the former sheet. A magnetic record sheet from which a magnetically recorded information will be transferred on another magnetic record sheet is called a magnetic record matrix plate hereinafter.

If a magnetic record matrix plate includes a magnetized track of spiral shape on which information has been magnetically recorded then a transferred record sheet will include a magnetized track of spiral shape having a sense of convolution reverse to that on the matrix plate. On the other hand, magnetic reproducing machines using magnetic record sheets of the spiral track type are constructed and arranged such that magnetic transducer heads effect spiral movement relative to the sheets in a predetermined sense of convolution. Therefore, a magnetic record matrix plate from which magnetically transferred record sheets are prepared to be used in the magnetic reproducing machines as abovementioned must include a spiral track having a reverse sense of convolution as compared with conventional magnetic record sheets of spiral track type.

A magnetic recording and reproducing machine of spiral track type is disclosed in the copending U.S. application Serial No. 63,354 filed October 18, 1960, by the present applicant, entitled "Magnetic Recording and Reproducing Machines." According to the copending application a magnetic recording and reproducing machine comprises a stationary copying plate including a spiral groove formed on one surface thereof, a rotatory disk disposed in substantially parallel relationship to the copying plate and adapted to be rotated about an axis passing through the center of convolution of the spiral groove, a magnetic transducer head slidably mounted on the rotatory disk, and a tracer for engaging the spiral groove on the copying plate to trace the same. The magnetic transducer and the tracer are arranged such that they are rotatable about said axis with a predetermined distance maintained therebetween.

An object of the present invention is to provide a device for magnetically recording information on magnetic record matrix plates by using a magnetic recording and reproducing machine such as that just above described.

According to the invention, there is provided a device for preparing magnetic record matrix plates in a magnetic recording machine comprising a stationary copying plate including a pair of spiral grooves on respective, opposite side surfaces of the plate. The plate is positionable with the grooves alternatively in an operative position. A rotary driven disk is disposed in substantially parallel relationship to the copying plate and is adapted to be rotated about an axis passing through the center of convolution of the spiral grooves on the copying plate. A magnetic reproducing and recording transducer head is provided slidably mounted on the rotatory disk. A tracer member is provided which in operation is engageable alternatively with the spiral grooves on the copying plate to trace the same for guided travel therein in dependence which groove is the operative position. The magnetic transducer head and the tracer member are arranged such that they are rotatable about said axis with means maintaining a predetermined distance between them. Means are provided slidably mounting the transducer and tracer member for rotation with said disk and for travel radially relative to said coaxial plate and disk. The spiral grooves have the same pitch and each has a reverse sense of convolution relative to each other. An electric switch of the double throw type is controlled by the rotatory disk, by reversible operation thereof. The rotatory disk is arranged to be removably mounted on a shaft the longitudinal axis of which coincides with the axis passing through the center of convolution of each of the spiral grooves with either of said spiral grooves engaging said tracer member. The electric switch is operative to reverse the direction of rotation of the rotatory disk when the copying plate is mounted on the shaft with spiral grooves engaging the tracer member. The directions of rotation is dependent upon which groove is in the operative position.

For better understanding of the invention, reference should be had to the following description taken in conjunction with the accompanying drawings in which.

Figures 1, 2, 3, 4, 5:
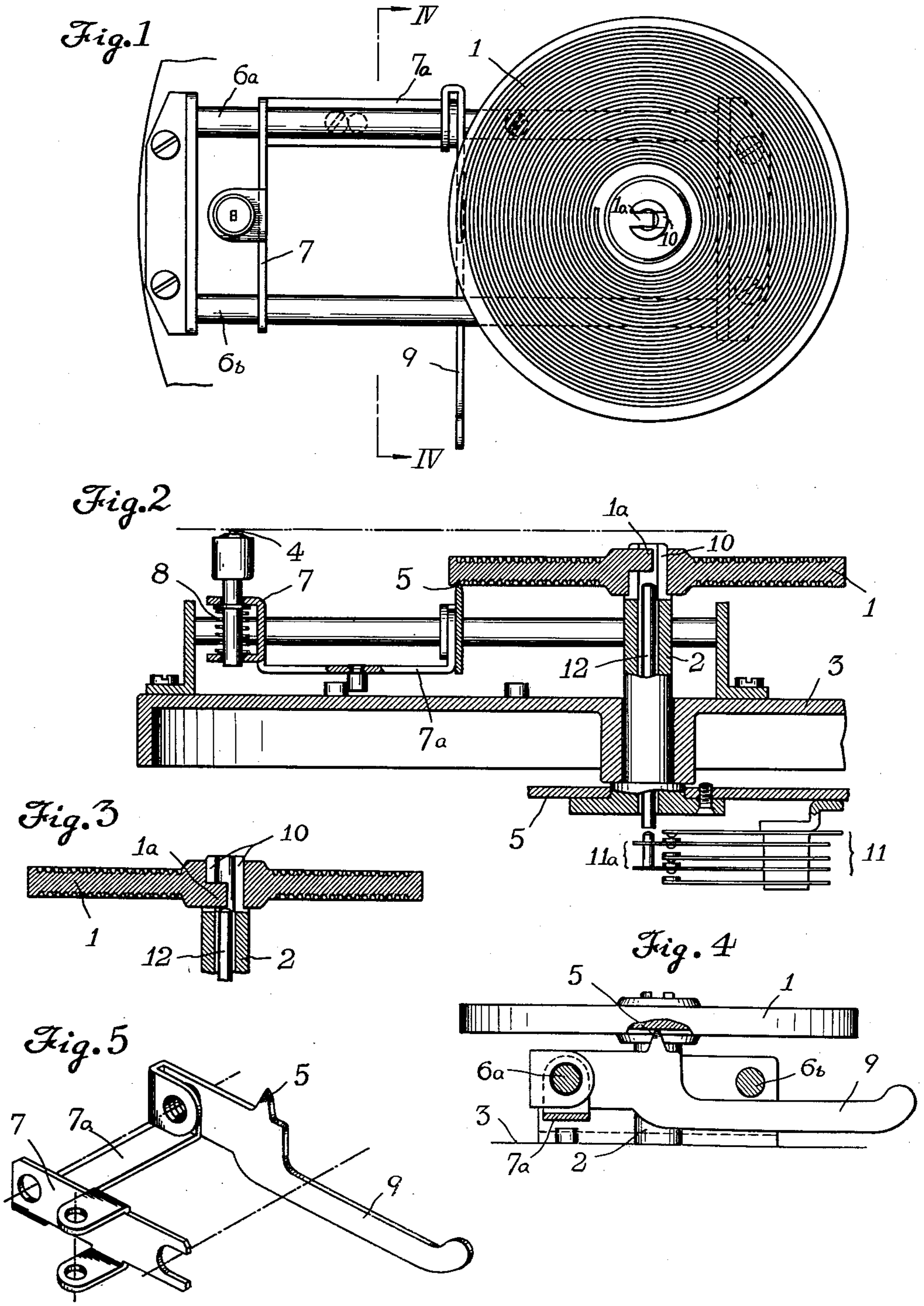
FIG. 1 is a plan view of essential parts of a magnetic recording machine embodying the teaching of the invention.
FIG. 2 is an elevational side view, partially in vertical section of the machine illustrated in FIG. 1.
FIG. 3 is a vertical section of a copying plate mounted to a top of a stationary shaft in reverse position.
FIG. 4 is a section taken along the line IV—IV of FIG. 1 with a part of the copying plate cut away for illustrating the engagement of the same with a pointed tracer.
FIG. 5 is a perspective view of a frame for holding a magnetic transducer head and including a pointed tracer.

Referring now to the drawings, a stationary base plate 5 a portion of which is shown in section in FIG. 2 is suitably disposed within a casing (not shown) and includes secured thereto a vertical tubular shaft 2. At the upper end of the shaft 2 a horizontal copying plate 2 of preferably circular shape is removably mounted against rotation. The copying plate 1 is provided on the lower surface with a spiral groove having the center of convolution coinciding with a point on the longitudinal axis of the shaft 2. A rotary disk 3 having a pendent periphery is rotatably mounted on the shaft 2 between the copying plate 1 and the base plate 5 and includes a pair of parallel feed rods 6_a_ and 6_b_ carried by the same through a pair of brackets. The pair of feed rods 6a and 6b are disposed symmetrically with respect to the shaft 2 and includes slidably mounted thereto a holding frame for holding a magnetic transducer head 4.

As best shown in FIG. 5, the head holding frame comprises a cross member 7 including an aperture in one end portion and a forked portion at the other end. The cross member 7 also includes substantially in the middle portion a pair of bent lugs which, in turn holds resiliently the magnetic transducer head 4 through a spring 8 (FIG. 2). The transducer head 4 tends to be biased upwardly by the spring 8. A spacing member 7a extends laterally from the lower edge of the apertured end portion of the cross member 7 and has a free end portion bent upwardly. The upright portion of the spacing member 7a is sandwiched between a bent end portion of the guiding member 9 and that portion thereof facing the bent portion with the three portions including a common aperture aligned with the aperture in the cross member 7. The guiding member 9 is provided with a pointed projection 5 on the upper edge at a distance from the center of the aperture substantially equal to half the distance between the longitudinal axis of the feed rods 6a and 6b and is allowed to be somewhat turned about the axis of the aperture for a purpose which will be described hereinafter. The apertures and the forked portion of the holding frame are dimensioned and arranged such that, when the holding frame is mounted on the two feed rods one of the rods for example the rod 6a extends slidably through the apertures while the other rod 6b engages slidably the forked portion. Moreover, the spacing member 7a will be disposed immediately below the rod 6a in substantially parallel relationship to the same and the pointed projection 11 will engage the spiral groove on the copying plate 1 and acts as a tracer for the spiral groove.

According to the present invention, the copying plate 1 is provided on the other surface with a spiral groove having the same pitch and the reverse sense of convolution as does the lower spiral groove. The copying plate 1 may be removably mounted to the shaft 2 against rotation in any suitable manner. Preferably, the upper end portion of the tubular shaft 2 includes a pair of opposed parts formed in rectangular recesses 10 and the copying plate 1 includes its hub having a radial projection 1a partially extending into the central opening of the same and adapted to be snugly fitted into one of the recesses. As shown in FIGS. 1 and 3, the projection 1a is less thick than the hub and has its outer surface flush with the associated surface of the hub.

An electric switch of double throw type 11 is inserted in an electrical circuit for energizing an electric motor (not shown) to drive the rotatory disk 1 through any suitable transmission gearing. As shown in FIG. 2, the switch 11 is mounted to the lower surface of the base plate 5 approximately below the tubular shaft 2.

In order to operate the double throw switch 11, a bar 12 is inserted in the central opening of the tubular shaft 2 and rests on an end of one of movable switch arms 11a with an electrical insulator disposed therebetween. The one switch arm is operatively coupled to the other of the movable switch arms. If the copying plate 1 is mounted to the tubular shaft 2 in a first position shown in FIG. 2 then the upper end of the bar 12 is positioned slightly higher in level than the lower surface of the hub but is separated away from the projection 1a of the hub with the switch 11 being in its normal position. However, if the copying plate 1 is mounted on the shaft 2 in a second or inverted position shown in FIG. 3 then the bar 12 is pressed down by the projection 1a of the hub to drive the switch to the other operating state.

The machine described above is operated as follows:

With the copying plate 1 mounted on the tubular shaft 2 in the one state shown in FIG. 2, it is assumed that the magnetic transducer head 4 and the pointed tracer 5 is in the outermost ends of the respective strokes or in the lefthand end positions as viewed in FIG. 2. Then a magnetic record sheet to be magnetically recorded is placed on a stationary plate designated at dotted-and-dashed line in FIG. 2 with its layer of magnetic layer facing the magnetic transducer head 4.

An electric motor (not shown) is supplied with an electric current to rotate the rotatory disk 3 in a predetermined direction. This causes the pointed tracer 5 to be moved along the spiral groove on the copying plate 1 to be moved toward the shaft 2 while rotated about the same. Accordingly the magnetic transducer head 4 separated away from the tracer 5 by a predetermined distance is similarly moved with respect to the shaft 2 to describe on the stationary magnetic record sheet a spiral track having a pitch equal to that of the spiral groove on the copying plate 1 and a diameter larger than that of the latter groove. In this case the transducer head 4 applied with an electric signal representing an information to be recorded will form a magnetized track of spiral shape on the magnetic record sheet whereby the information will be magnetically recorded on the sheet.

If it is desired to magnetically record an information on a magnetic record matrix plate, the copying plate 1 is mounted on the shaft 2 upside down as shown in FIG. 3. This allows the switch 11 to be driven in the other of operating states in which the energized motor will be rotated in the direction reverse to that utilized during ordinary recording operation. With the magnetic transducer head 4 and hence the pointed tracer 5 positioned in the outermost end positions of the respective strokes as in the previous case, a magnetic record matrix plate to be magnetically recorded is placed on the stationary plate 15 with its layer of magnetic material facing the magnetic transducer head followed by the energization of the motor and the application of an electric signal to be recorded to the transducer head. As in the previous case, the transducer head 4 is moved toward the shaft 2 while rotated about the same to describe a magnetized track of spiral shape on the record plate. In this case, however, the spiral track on the matrix plate has the sense of convolution reverse to that in ordinary recording. Therefore, the resulting record matrix plate is suitable to be used in transferring the recorded information on other magnetic record sheets.

After the completion of the recording operation, the free end portion of the guiding member 9 can be pressed down to pull out the tracer 5 externally of the spiral groove on the copying plate 1 to thereby rapidly return both the transducer head and the tracer to their initial positions.

From the foregoing it will be appreciated that, with either of the two spiral grooves on a copying plate assigned for magnetic record matrix plate, an electric motor for driving a magnetic transducer head can be driven in the direction suitable for preparing a magnetic record matrix plate merely by mounting the copying disk on a shaft in such way as to engage the groove assigned for the matrix plate, with a tracer operatively coupled to the transducer head.

What I claim is:

In a magnetic recording and reproducing apparatus, in combination, a stationary plate having a pair of coaxial spiral grooves on respective opposite side surfaces of said plate positionable alternatively with one of said grooves in an operative position, said grooves having an identical pitch and having respective convolutions in an opposite sense, a rotary driven disk disposed parallel to said plate for rotation coaxially with said plate and said pair of grooves, a reproducing and recording transducer, a tracer member engageable in operation alternatively with said grooves for guided travel therein in dependence upon which groove is in said operative position, means rigidly connecting said tracer and said transducer to maintain a predetermined distance therebetween, means for slidably mounting said transducer and said tracer member for rotation with said rotary driven disk and for travel radially relative to said coaxial plate and disk, means comprising switch means operable by said plate for controlling reversible operation of said disk in dependence upon the groove disposed in said operative position, the last-mentioned means including means for automatically controlling rotation of said disk in one direction when one of said grooves is in cooperative relation with said tracer and for automatically controlling rotation in an opposite direction when said tracer and the other of said pair of grooves are in cooperative relationship.

References Cited in the file of this patent

FOREIGN PATENTS 832,073 Germany -------------- Feb. 21, 1952